United States Patent [19]

Eichweber

[11] Patent Number: 4,695,256
[45] Date of Patent: Sep. 22, 1987

[54] METHOD FOR PRACTICING AIMING WITH THE USE OF A LASER FIRING SIMULATOR AND OF A RETROREFLECTOR ON THE TARGET SIDE, AS WELL AS FIRING SIMULATOR FOR CARRYING OUT THIS METHOD

[75] Inventor: Kurt Eichweber, Hamburg, Fed. Rep. of Germany

[73] Assignee: Precitronic Gesellschaft, Hamburg, Fed. Rep. of Germany

[21] Appl. No.: 812,793

[22] Filed: Dec. 23, 1985

[30] Foreign Application Priority Data

Dec. 31, 1984 [DE] Fed. Rep. of Germany ....... 3447887
Oct. 9, 1985 [DE] Fed. Rep. of Germany ....... 3436108

[51] Int. Cl.$^4$ .............................................. G09B 9/00
[52] U.S. Cl. ......................................... 434/22; 434/20
[58] Field of Search .................................. 434/20, 22

[56] References Cited

U.S. PATENT DOCUMENTS 4,302,191 11/1981 Weibull .................................. 434/20
4,478,581 10/1984 Goda ..................................... 434/22
4,592,554 6/1986 Gilbertson ............................. 434/22

Primary Examiner—Leo P. Picard
Attorney, Agent, or Firm—Handal & Morofsky

[57] ABSTRACT

Method and firing simulator for practicing aiming with the use of a laser firing simulator and of a retroreflector on the target side, as well as a simulator for carrying out this method. On triggering of the simulated firing, the target distance, the velocity of the target relative to the line of sight and the aiming-off allowance are measured, and the position of the hit is computed therefrom after the elapse of the projectile flight time.

15 Claims, 3 Drawing Figures

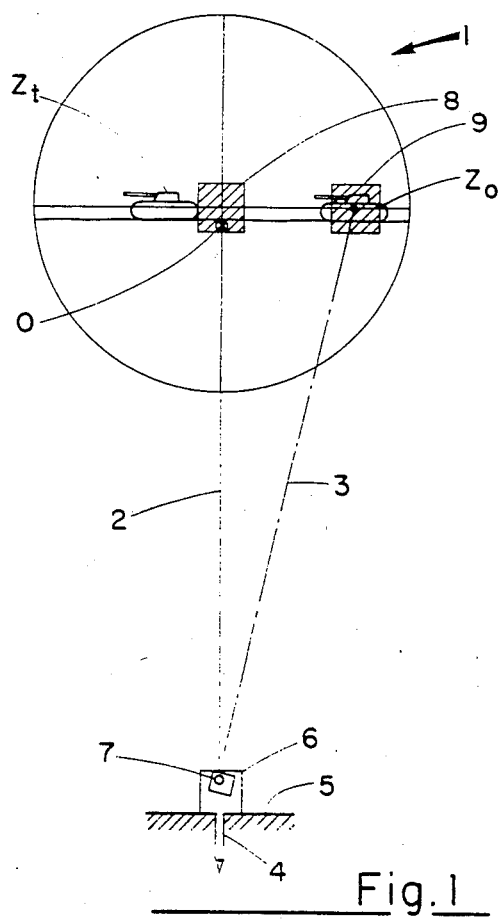
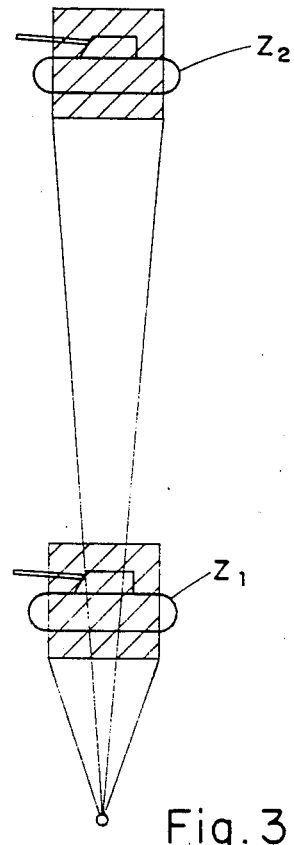
Fig. 1
Fig. 3
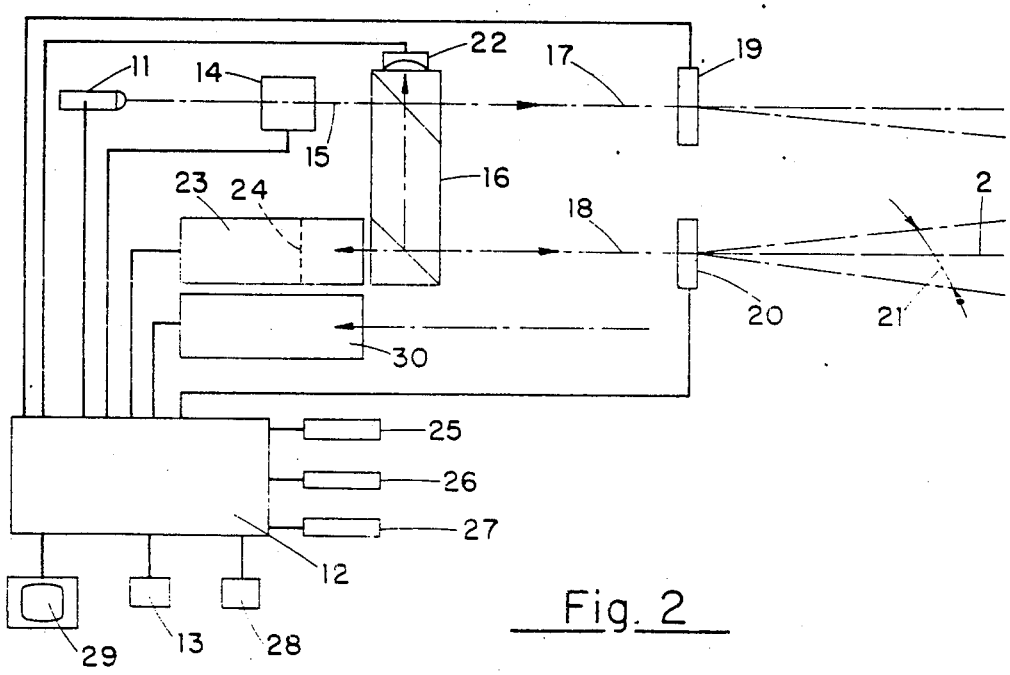
Fig. 2

METHOD FOR PRACTICING AIMING WITH THE USE OF A LASER FIRING SIMULATOR AND OF A RETROREFLECTOR ON THE TARGET SIDE, AS WELL AS FIRING SIMULATOR FOR CARRYING OUT THIS METHOD

DESCRIPTION

The invention relates to a method for practising aiming with a firearm using a laser firing simulator and a retroreflector on the target side, in which method a hit position is determined by measurement of the target in relation to a reference line and on the basis of a target distance measurement undertaken on discharge of the projectile and relates, as well, to a firing simulator for carrying out this method.

The result of practice aiming must make it possible for the trainee to make a comparison between the aiming parameters he sets, in particular angle of elevation and aiming-off allowance, and the plotted hits achieved. In the case of a laser firing simulator, firing is simulated by a laser beam or by an imaginary line within a laser beam scanning pattern, which also serves for the measurement of the position of the target; in known scoring devices—in a manner analogous to the actual firing process—the time after the elapse of the projectile flight time is taken as a basis for the score. It is disadvantagous in connection with this that scoring also affected by chance phenomena of target movement during the projectile flight time, which would indeed be of interest as regards the actual success of the firing, but which falsify the assessment of the target performance. In the case of the known devices, the problem furthermore arises that in order to determine the plotted hits the aiming data from the time of triggering the firing and the target data from the time after the elapse of the projectile flight time must be compared with one another; this presupposes either stopping the aiming system or the storage of the aiming data at the moment of the triggering of the firing (West German patent specification No. 1,250,764).

The invention is based on the recognition, which is inventive as such, that with regard to the indicated circumstances it is more expendient for the purposes of the determination of the plotted hits not to rely upon the time of hitting the target but upon the time of triggering of firing.

The object of the invention is to provide a method of the initially mentioned kind, as well as an arrangement for carrying out this method, which develop the plotted hits from the data at the time of discharge of the projectile.

The solution according to the invention consists in that the angular velocity of the target relative to the reference line and the aiming-off allowance of the weapon are measured on triggering firing, and the hit position after the elapse of the projectile flight time is determined therefrom. The line of sight is expediently employed as reference line. Since the measurements can require a certain period of time, depending upon the manner in which they are made, their point in time cannot be determined with precise reference to that of the triggering of firing; the essential distinctive feature as compared with the prior art consists in that they are completed prior to the elapse of the projectile flight time.

In the case of a stationary weapon or a stationary simulator, it is indeed possible to compute from the angular velocity of the target and the set aiming-off allowance the plotted hits, namely the position of the probable hit on the target, if this continues its movement in an unchanged manner, for the point in time after the elapse of the projectile flight time.

If in accordance with a further feature of the invention the actual angular velocity of the line of sight is also measured, the same determination can also be undertaken for the case of a moving weapon or simulator.

A firing simulator for carrying out the above-mentioned method requires the presence of a laser beam emitter, a receiver for the laser light reflected by the target, a laser range finder, an arrangement for the determination of the position of the beam reflected by the target in relation to the reference line, a trigger for triggering the simulated firing and an evaluation arrangement for the determination and, where appropriate, the display of the hit position. It can be connected however, this is not absolutely necessary. According to the invention, it is characterized in that arrangements for the measurement of the angular velocity of the target in relation to the reference line and of the aiming-off allowance are provided, which are connected with the evaluation arrangement in such a manner that their measurement results related to the time of discharge of the projectile can be fed to the evaluation arrangement. The device is expendiently equipped with an arrangement for the measurement of the angular velocity of the line of sight.

Arrangements for the determination of the angular velocity of a cooperative object observed by means of laser optics relative to the reference axis of the observation system are known per se. For the purposes of the invention, they are especially suitable in circumstances in which they are small, light and fast. At the present time, these requirements are best satisfied by a video camera (CCD camera), which records the laser echoes reflected back by the target in a form optically filtered out, and evaluates them in a form correlated in sequences separately from the complete reproduction of the image, as regards their rate of change in space-time terms, wherefrom the movement of the target is found in the form of the angular velocity in relation to the observation system (line of sight). The necessary aiming-off allowance is in these circumstances obtained, with due consideration being given to any actual angular velocity of the observation system itself which may be applicable, from the projectile flight time, which is derived from the distance measurement with due consideration being given to the ballistic data of the type of projectile assumed to have been employed. The aiming-off allowance computed in this manner is compared with the aiming-off allowance set by the marksman, from which the plotted hits are obtained.

The same determination of the plotted hits can also be undertaken in respect of the height direction. However, according to the invention, at least in the case of ground targets, it is in general sufficient only to consider the lateral direction, since any possible error in the angle of elevation may readily be determined from the comparison of the set angle of elevation with the correct angle of elevation obtained from the distance measurement and the ballistic data, and may be displayed in the plotted hits.

In place of a video camera or another receiving arrangement having resolving power in respect of the direction of the received, reflected laser signals, in order to measure the target and the determination of the relative angular velocity derived therefrom, recourse may also be had to the scanning of the target field with a narrow moving laser beam (West German patent specification No. 1,703,109). However, this requires relatively heavy optical deflecting systems and associated drive arrangements. Accordingly, it is preferred to employ an embodiment of the laser beam emitter for large-area target field illumination. This is expediently designed for an approximately constant width independent of distance, because this permits optimal utilization of the laser power, even over relatively large distances.

At least in the case of alignment on surface-bound targets (for example battle tanks), it is indeed possible to illuminate the entire target field with a laser beam, which field includes the target itself and its possible range of movement within the projectile flight time; however, this requires high laser power and, having due regard to the energy density which cannot be exceeded, if damage to the eyes is to be avoided, objectives which have a large area and which are heavy. According to the invention, it is accordingly more expendient if the width of the laser beam cross-section in the target region is smaller than the width of the maximum target field to be illuminated and the laser beam emitter is designed for a beam alignment deflected laterally from the line of sight, it being ensured that, at least during periods of time sufficient for the measurement, the laser beam is directed to the target.

One possible embodiment of this concept consists in that the laser beam is designed to be automatically target-seeking. If the camera receives no reflected laser signal in the case of alignment of the beam in the rest position, which in general coincides with the line of sight, then the beam is deflected to the right and to the left until it comes into a position in which the camera receives a reflection signal, and is fixed in this position. In place of this, it can also be deflected permanently, in which case the measurement remains restricted to the periods of time in which it sweeps over the retro-reflector of the target. As a rule, this deflection has no connection with scanning for the purpose of location, but simply serves for target illumination, while location is undertaken by the camera, which resolves in a direction-sensitive manner.

The lateral deflection can embrace the entire laser beam. However, in place of this it is also possible according to the invention, and in many cases preferable, for a partial beam to be permanently directed on to the line of sight and for merely another partial beam, coupled out by means of a beam splitter, to be deflected in order to enlarge the illuminated part of the target field.

Although reference has been made hereinabove only to the arrangement of one retroreflector at the target, this does not exclude the arrangement of several retroreflectors at the target, which are disposed in groups or patterns.

The firing simulator is equipped, in known manner, with arrangements for the display of the hit result. A monitor is especially advantageous, which images the target and a hit mark, in a manner known per se.

It the firing simulator is fitted to a weapon component which participates in the setting of the aiming-off allowance of the gun (for example the barrel or the fire screen), then the firing simulator is directed close to the target according to the aiming-off allowance setting. However, the laser beam must strike the target, in order to make possible its measurement and, where appropriate, the transfer of information to the target (more particularly, communication of the hit result). According to the invention, it can therefore be provided that the firing simulator includes arrangements for the resetting of the laser beam emitter by the aiming-off allowance.

The invention will be explained in greater detail hereinbelow with reference to the drawing. In the drawing:

FIG. 1 shows a schematic representation of the target field, seen through the sight, and of the observation arrangement, FIG. 2 shows the construction of a firing simulator and FIG. 3 shows the angular relationships in the case of the illumination of targets located at different distances.

In the target field 1 it is possible to see a target Z, which is shown in the form of a tank, in a first position $Z_o$, which it is to have at the instant at which firing is triggered, and in the position $Z_t$, which it has after the elapse of the projectile flight time. The hit position is indicated at 0. The representation of the target $Z_t$ and of the hit position 0 gives in total the plotted hits. It will be seen that the hit, in terms of the movement of the target, is disposed behind the latter, and accordingly the aiming-off allowance was set to be too short. Moreover, it is too low, i.e. the angle of elevation was set too small, corresponding to a distance which was too short.

A picture which is fundamentally the same can be produced on a display device of the firing simulator, for example on a monitor, which is provided for the purpose of monitoring the aiming process by the trainer; in this procedure, the hit position is made evident by an appropriate mark in relation to the position of the target $Z_t$. In the example shown, it is provided that the hit position in the sight or on the display device is situated on the ordinate. This is in general the case in circumstances in which the sight is fixedly connected with the weapon in the azimuth direction. In this case, the broken line 2 forms the line of sight. On the other hand, if an arrangement for the automatic setting of the aiming-off allowance is provided between the sight and the weapon, their azimuth directions do not coincide. In this case, the sight (and thus the line of sight) is in general oriented according to the target line, which is represented by the broken line 3 at the instant of triggering of firing.

In FIG. 1, the sight is indicated at 4 behind a fire screen 5, which carries the firing simulator 6.

The firing simulator 6 includes a laser beam emitter 7 and a receiver, which will be explained later, for the laser signal reflected at a retroreflector on the target, which is designed to resolve the direction of reception and accordingly requires large-area illumination of the target field.

The illumination of the target field in its total width represented in FIG. 1 would be very costly. Accordingly, in order to illuminate the target field a laser beam is provided, which forms at the target distance a principal illumination field 8, which is emphasized in FIG. 1 by hatching and which is emitted in the direction of the line of sight 2. It is to be regarded as of large area, insofar as its dimensions amount to a multiple of the resolution which is to be achieved in the determination of the position of the target. For example, if the resolution of the system is between 0.1 and 0.5 m, then the dimensions of the illuminated region 8, i.e. the dimensions of the beam cross-section at the distance of the target, can be about $4 \times 4$ m.

In many cases, for example in the case of stationary or slow-moving targets, the illumination of the target field to the extent of the surface 8 is sufficient. However, in the case of rapidly moving objects the aimingoff allowance can be greater than one half of the transverse measurement of this field 8. In these circumstances, at the time of triggering of firing the target is situated in the position $Z_o$ outside the illuminated field 8. In these circumstances, the laser beam employed to illuminate the target field is deflected in whole or in part, in a manner to be explained hereinbelow, in order to form illumination field 9, which is set for example on the basis of a known searching function at the target position $Z_o$ and accordingly permits the measurement of the target at the time of the triggering of the simulated firing (or slightly before or after this).

In order to obtain adequate illumination even at a relatively large distance with moderate energy density of the laser beam, an adjustment of the divergence of the laser beam to the respective target distance is provided in such a manner that in each instance a predetermined size of the illuminated field 8 or 9 is created. This is schematically illustrated in FIG. 3. It is seen therein that for targets $Z_1$ and $Z_2$ respectively, in respect of which different distances were measured, the divergence 10 of the illuminating laser beam is adjusted in such a manner that the illuminated field, which is indicated by hatching, possesses in each instance the same size in the target region.

The firing simulator has schematically the construction explained hereinbelow with reference to FIG. 2.

A laser 11 is controlled by the controlling and computing unit 12, when simulated firing is triggered by means of the key 13. In the beam path of the laser 11 there is disposed an optical arrangement 14, which—in dependence upon the result of the distance measurement—sets the divergence of the laser beam 15 according to the signal of the controlling and computing unit 12 as a function of the distance in such a manner that the beam cross-section possesses in the target region a predetermined size which is invariably the same.

There follows a beam splitter 16, which splits the laser beam 15 into a first partial beam 17 and a second partial beam 8, which are emitted parallel to one another. The direction of the first partial beam 17 is fixedly coupled to the direction of sighting 2. Where appropriate, the ballistic angle of elevation can be compensated by an optical arrangement 19, if the arrangement for coaxial assembly is provided in the bore of a weapon. Lateral deviation of the partial beam 17 from the vertical plane of the line of sight is not provided, but can be provided.

On the other hand, the partial beam 18, which extends in the first instance parallel to the partial beam 17, passes through an optical arrangement 20, which can impart to it not only the described vertical correction but also a horizontal deflection in the direction of the arrow 21 on both sides of the direction of the line of sight 2 or of the vertical plane of the line of sight respectively, controlled by the controlling and computing unit 12.

The laser light sent back coaxially from a retroreflector provided at the target (for example a triple reflector) passes the optical arrangement 20 and passes, through the beam splitter 16, in part to the photodiode 22, which is provided for the distance measurement and which is connected to the controlling and computing unit 12, and into a first CCD camera 23, in front of which an infrared filter 24 for the suppression of the background radiation is connected.

The receiving arrangement is arranged to detect the direction from which the beam reflected back is coming. When this beam passes through the optical arrangement 20, its direction must be taken into consideration in the evaluation of the camera signal. Just like the camera itself, it is accordingly connected to the evaluation arrangement included in the controlling and computing unit 12. If the optical arrangement 20 executes a continuous scanning movement, its direction at the instant at which the returning beam is situated in the vertical central plane of the camera gives a measure of the azimuth between the line of sight and the target. In the case of a non-scanning arrangement, the camera itself is designed to resolve the direction of reception, in order to be able to determine the direction of incidence and to communicate this to the evaluation arrangement in the controlling and computing unit 12. Finally, it is in the context of the invention also possible and particularly expedient if the optical arrangement 20 executes a lateral swinging movement merely for the purpose of seeking the target and after lock-on adopts a stationary or quasi-stationary condition; in these circumstances, the camera can likewise be designed to be direction-resolving, and the deflection direction of the optical arrangement 20 is taken into consideration in the evaluation of its signal.

The optical arrangement 20 is caused to execute the searching movement in each instance in circumstances in which the camera 23 receives no signal reflected by the target, either until such time as such a signal is received or indeed permanently, in which case on each passage of the beam through the target region a measurement or a series of measurements is carried out by the camera.

A sensor 25 is provided to determine the actual angular movement of the line of sight itself in the lateral direction. A sensor 26 serves to determine the swing, and a sensor 27 to determine the elevation. Further sensors can of course also be provided for the determination of parameters, as is known in the case of pertinent devices.

Further data can be fed into the controlling and computing unit at 28, e.g. the type of munition, the ballistic data of the various types of munition which can be employed being stored in the controlling and computing unit.

Finally, display arrangements for the hit result are provided, principally a monitor 29, on which important data of the hit result can be displayed. If only the camera 23 is employed, then what is involved comprises the magnitude of the set aiming-off allowance and the actual position of the target and the hit. The set angle of elevation and the error in the angle of elevation can also be displayed, the latter not being determined by measurement of position but being computed on the basis of the distance measurement.

If a second video camera 30 is provided, the real image of the target can also be reproduced together with faded-in marks for characteristic features of the plotted hits, in particular the position of the hit. The two cameras can have differing focal lengths, appropriate to their purpose of application, on the one hand for the measurement of the target and on the other hand for the general display. The second camera can also include a crosswire, in order to provide the trainer with an accurate image of the sight image.

The measurements can take place in very short periods of time, which follow the triggering of firing and which amount to fractions of a second. Expediently, they are less than the human reaction time of 0.1 second.

When a simulated firing is triggered or triggering thereof is directly imminent, the laser beam 17 and 18 respectively is emitted and the target is detected. On the basis of the distance measurement, the beam divergence is set and as a result of this an optimum target illumination is achieved. The target is now measured with regard to its velocity and its position, and this takes place in relation to the time of discharge of the projectile. If the measurement or parts of the measurement take place before or after this time, the evaluation unit 12 undertakes an appropriate conversion. Furthermore, it computes the position of the target $Z_t$ after the elapse of the projectile flight time evident from the distance measurement and the ballistic data of the munition which is assumed to be applicable, and compares this with the position of the hit. The result can be utilized in known manner, for example by display on the monitor of a trainer and/or in the sight of the marksman and/or by recording at a manoeuvre command post and/or by communication to the target.

I claim:

1. A method for practising aiming with a firearm, using a laser firing simulator and a retroreflector on the target side, comprising the steps of determining the hit position achieved after the elapse of the projectile flight time by measuring the target in relation to a reference line extending from said simulator on the basis of a target distance measurement undertaken on simulated discharge of the projectile, wherein the relative angular velocity of the target to the reference line and the aimingoff allowance of the firearm are measured before the elapse of the projectile flight time and the hit position is determined therefrom after the elapse of the projectile flight time.

2. A method as in claim 1, wherein the line of sight is employed as reference line.

3. A method as in claim 1, wherein the angular velocity of the line of sight is determined and is taken into account in the determination of the hit position.

4. A method as in claim 3, wherein measurement of angular velocity of the target, measurement of the aiming-off allowance and measurement of angular velocity of the line of sight takes place at the time of the discharge of the projectile.

5. A firing simulator for practising aiming with the use of a taget equipped with a retroreflector which simulator comprises a laser beam emitter for emitting light in the direction of said target, a receiver for the laser light reflected by the target, a laser range finder responsive to said reflected light, means for detecting the position of light reflected by the target relative to a reference line, a trigger for triggering a simulated discharge of a projectile, an evaluating arrangement for the determination of the hit position after the elapse of projectile flight time, measurement means for measurement of the angular velocity of the target in relation to the reference line and of aiming-off allowance, said measurement means being connected with the evaluating arrangement in such a manner that their measurement results related to the time of discharge of the projectile can be coupled to the evaluating arrangement.

6. A firing simulator according to claim 5, wherein a receiver resolving the direction of reception establishes the velocity of the target relative to the line of sight.

7. A firing simulator according to claim 6 wherein the receiver comprises a video camera.

8. A firing simulator according to claim 5, wherein said means for detecting the position of the light reflected by the target includes means for measuring the distance of the target.

9. A firing simulator according to claim 8 wherein said simulator is connected with a weapon component participating in the setting of the aiming-off allowance of the weapon, and includes arrangements for the resetting of the laser beam emitter by the aiming-off allowance.

10. A firing simulator according to claim 8 wherein the laser beam emitter is designed for large-area target field illumination.

11. A firing simulator according to claim 10, wherein the laser beam emitter is designed for target field illumination of approximately constant width independent of distance.

12. A firing simulator according to claim 10, wherein the width of the beam cross-section in the target region is smaller than the width of the maximum target field to be illuminated, and wherein the laser beam emitter is designed for lateral beam deflection.

13. A firing simulator according to claim 12, wherein the laser beam emitter includes a beam splitter, and wherein a partial beam passes through an arrangement for lateral beam deflection, while the other beam remains in a state of rest.

14. A firing simulator according to claim 12, wherein the lateral beam deflection can be triggered by the absence of a reflection signal.

15. A firing simulator according to one of claim 8, further comprises a monitor which images the target field and a hit mark.

* * * * *